3,497,382
METHOD OF PRODUCING PURE, RED LEAD MONOXIDE
Wim Kwestroo and Petrus Helena Gerardus Maria Vromans, Emmasingel, Eindhoven, Netherlands, assignors, by mesne assignments, to U.S. Philips Corporation, New York, N.Y., a corporation of Delaware
No Drawing. Continuation-in-part of application Ser. No. 518,482, Jan. 7, 1966. This application Mar. 8, 1966, Ser. No. 532,578
Claims priority, application Netherlands, Jan. 15, 1965, 6500458
Int. Cl. B44d 1/14, 1/18; C23c 11/00
U.S. Cl. 117—201      2 Claims This application is a continuation in part of application Ser. No. 518,482 filed Jan. 7, 1966, now Patent No. 3,450,496.

This invention relates to a method of producing pure, red lead monoxide.

Lead monoxide can be obtained by treating a lead compound, e.g. lead nitrate dissolved in water with a basic substance such as caustic soda. The product thus obtained contains sodium as an impurity.

In a known method for producing pure lead monoxide in this manner it is therefore necessary to choose starting materials which do not introduce impurities into the lead monoxide to be produced. For this reason it is logical to use lead acetate as the water-soluble lead compound and ammonia ($NH_3$) as the basic substance in the form of an aqueous concentrated solution (concentrated ammonia). The reaction must be carried out at a higher temperature in order to obtain a rapid conversion. The high temperature, however, promotes the contamination of the product and brings about a high consumption of ammonia.

During the treatment of lead acetate in an aqueous solution with concentrated ammonia a white precipitate is formed at room temperature practically immediately, which precipitate may consist, depending upon the concentrations of the starting materials, of basic lead acetate or lead hydroxide or a mixture of both compounds.

After stirring for some time the white precipitate changes usually into a green, crystalline mass. X-ray analysis shows that this crystalline mass consists mainly of lead monoxide of orthorhombic crystal structure. In certain cases the conversion takes place only after the precipitate has been washed several times with concentrated ammonia. The green crystalline precipitate is filtered off and dried at a temperature between 70 and 95° C., after which it is heated at 150° C., in order to expel traces of water and any volatile impurities from the product. The color changes thereby into yellow.

The yellow lead monoxide thus obtained does not have the purity required for certain uses. For example, it may contain in general about 0.1% by weight of carbon, 0.1% by weight of water and 100 p.p.m. of silicon. Even if the lead monoxide is heated in a stream of oxygen at a temperature of 600° C., it is not possible to reduce the carbon content resulting from occluded acetate residues to a value of less than about 0.05% by weight. Moreover, the density of the lead monoxide thus obtained appears not to be reproduceable; it may vary between 0.6 and 3.5 gm./cm.$^3$.

The yellow orthorhombic lead monoxide is, in fact, metastable at a temperature below about 580° C. It may be changed over at room temperature into the stable red, tetragonal lead monoxide by boiling it for a very long time (several days) with water or by heating it for a long time near the change-over temperature.

A principal object of the invention is to provide a method for producing very pure lead monoxide.

A further object of the invention is to provide a method for obtaining pure, red lead monoxide economically.

The invention is based upon the discovery that both the conversion of the white precipitate into the green lead monoxide and the conversion of this lead monoxide into the stable, red, tetragonal lead monoxide are inhibited by silicon, if the content thereof on the basis of the quantity of lead monoxide exceeds about 20 p.p.m.

In accordance with the invention, very pure lead monoxide is produced from lead acetate by a treatment with ammonia in an aqueous solution under silicon-free or such silicon-free conditions that the lead monoxide contains less than 20 p.p.m. of silicon.

The terms "silicon-free" or "substantially silicon-free" are to be understood to denote that only silicon-free or substantially silicon-free starting materials are used and that during their conversion the starting materials and the reaction product are not contaminated by silicon. In practice the latter can be achieved by carrying out the conversion in an apparatus made of a synthetic resin, a silicon-free metal alloy, a silicon-free metal or another material not containing silicon or not giving off silicon. Lead acetate can be obtained silicon-free to an adequate extent or it can be freed of silicon. The concentrated ammonia can be made by introducing ammonia into deionized water in an apparatus of silicon-free material. When these measures are taken, it appears that the various conversions are performed very rapidly.

When adding concentrated ammonia to a lead acetate solution, a green mass of orthorhombic lead monoxide is obtained from the white precipitate within a few minutes.

After washing by decanting a crystal transformation takes place at a temperature between 15° C. and 100° C. within a few hours, resulting in the red, tetragonal lead monoxide. This transformation takes place only when the silicon content of the lead monoxide is smaller than about 20 p.p.m., and when the lead monoxide is in an aqueous medium.

It has furthermore been found that the change-over of the white precipitate into the green mass of orthorhombic lead monoxide always takes place at room temperature without requiring further steps and that the concentrated ammonia need be only 10 N; also in this case the change-over takes place within a few minutes after the formation of the white precipitate. Concentrated ammonia at room temperature is about 15 N.

The red lead monoxide thus obtained contains at most only 10 p.p.m. of carbon and less than 10 p.p.m. of $H_2O$ after drying at 120° C., in contrast to lead monoxide obtained under non-silicon-free conditions, which contained about 0.1% by weight of carbon (1000 p.p.m.) and about 0.1% by weight (1000 p.p.m.) of $H_2O$ after drying at 120° C.

The lead monoxide produced in accordance with the invention has a density between 3 and 3.5 gm./cm.$^3$.

The lead monoxide obtained may be employed in television camera tubes having a photo-conductive lead monoxide target plate, and in photocells.

The following example is illustrative of the invention.

In a 2-liter vessel of polyethylene 165 gm. of pure lead acetate ($Pb(CH_3COO)_2 \cdot 3H_2O$) was dissolved in 350 ml. of deionized water. The vessel was placed on a magnetic stirring table. While stirring vigorously 1500 ml. of 10 N ammonia was added to the lead acetate solution. Immediately a voluminous precipitate was formed, which changed after a few minutes into a green crystalline mass. The precipitate was washed five times with 2 N ammonia by decanting. Then 200 ml. of water was added and the mixture was kept at 80° C. for a few hours. The resulting red crystalline mass was again washed five times with 2 N ammonia and dried at 95° C. in a platinum vessel. Then the dry red lead monoxide was heated at 120° C. The silicon content was about 1 p.p.m., the carbon content 10 p.p.m., the water content less than 10 p.p.m. (which could not be detected).

Lead monoxide produced by the method of the invention may be employed as the material for a photoconductive layer of a photo-resistor or the photo-conductive target layer in a television pick-up tube of the vidicon type. For obtaining such a target layer the lead monoxide may be evaporated in a low pressure atmosphere, i.e. an atmosphere with a pressure in the order of 1000, $10^{-5}$ mm. Hg, comprising oxygen and preferaby also watervapour and condensed onto a transparent electrode on the inside surface of a transparent front window of the tube. The condensed layer appears to consist wholly of the red, tetragonal modification of lead monoxide, X-ray analysis of the layer not being able to show any presence of the yellow, orthorhombic modification therein. The latter is quite contrary to what is found in such analysis of layers which have been obtained by evaporation and condensation of lead monoxide produced by a method different from that according to the invention.

What is claimed is:
1. A photoconductive device comprising a transparent conductive layer and an adhering coating consisting of tetragonal PbO containing less than 20 p.p.m. of silicon oxide.
2. A photoconductive device as claimed in claim 1 in which the PbO contains less than 10 p.p.m. of carbon.

References Cited
UNITED STATES PATENTS

| | | | |
|---|---|---|---|
| 2,888,370 | 5/1959 | Damon et al. | 117—201 |
| 3,307,983 | 3/1967 | Haan et al. | 117—200 X |
| 3,372,056 | 3/1968 | Haan et al. | 117—106 X |

WILLIAM L. JARVIS, Primary Examiner

U.S. Cl. X.R.

117—211, 106; 313—65; 23—146